US011859532B2

(12) United States Patent
Zhmudyak et al.

(10) Patent No.: US 11,859,532 B2
(45) Date of Patent: Jan. 2, 2024

(54) VIBRATORY PLATE AND ITS ENGINE

(71) Applicants: Alexandra Leonidovna Zhmudyak, Rehovot (IL); Leonid Moiseevich Zhmudyak, Rehovot (IL)

(72) Inventors: Alexandra Leonidovna Zhmudyak, Rehovot (IL); Leonid Moiseevich Zhmudyak, Rehovot (IL)

( * ) Notice: Subject to any disclaimer, the term of this patent is extended or adjusted under 35 U.S.C. 154(b) by 0 days.

(21) Appl. No.: 17/525,229

(22) Filed: Nov. 12, 2021

(65) Prior Publication Data

US 2022/0162985 A1 May 26, 2022

Related U.S. Application Data

(60) Provisional application No. 63/116,823, filed on Nov. 21, 2020.

(51) Int. Cl.

*F02B 71/04* (2006.01)
*F02B 75/16* (2006.01)
*F02B 63/02* (2006.01)
*E01C 19/40* (2006.01)
*E02D 3/046* (2006.01)

(52) U.S. Cl.

CPC .............. *F02B 71/04* (2013.01); *E01C 19/40* (2013.01); *E02D 3/046* (2013.01); *F02B 63/02* (2013.01); *F02B 75/16* (2013.01)

(58) Field of Classification Search

CPC .......... F02B 71/04; F02B 75/16; F02B 63/02; F01B 11/007; F01B 11/06; F01B 11/04; E01C 19/40; E02D 3/046

See application file for complete search history.

(56) References Cited

U.S. PATENT DOCUMENTS 2,609,813 A * 9/1952 Maurer .................... F02B 75/16 173/211
2,942,589 A * 6/1960 Wacker .................... E02D 3/068 173/162.1
3,417,828 A * 12/1968 Duyster .................... E02D 7/18 175/135
3,736,843 A * 6/1973 Leibundgut .............. C12Q 1/37 173/114
4,156,576 A * 5/1979 Clavel ...................... E02D 3/068 173/210
4,643,611 A * 2/1987 Pilachowski ........... E02D 3/074 74/61
5,540,193 A * 7/1996 Achten ................. F02B 71/045 123/46 SC (Continued)

*Primary Examiner* — Grant Moubry

(57) ABSTRACT

In vibratory plates (vibratory plate compactor machine), the reciprocating movement of an engine piston is converted into rotation of the crankshaft, and the latter is converted into rotation of an eccentric rotary shaft of vibrator unit, which create a periodic force that leads to reciprocating movement of the plate. Such a vibratory plate is complicated. It is proposed to use a free-piston engine with one piston as the engine for a vibratory plate. In this free piston engine, the piston moves reciprocally, and the cylinder performs reciprocating movements opposite to the movements of the piston. The cylinder is mounted vertically and fixed to the plate. In each engine cycle the gas pressure acts on the piston and cylinder. After combustion, the piston moves up and the cylinder moves down. Since the cylinder is fixed to the plate, it also moves downward and compacts soil, gravel, etc.

7 Claims, 10 Drawing Sheets

Fuel injection through injectors 14. Diesel cycle operation.

(56) References Cited

U.S. PATENT DOCUMENTS

| | | | | |
|---|---|---|---|---|
| 9,574,556 | B1 * | 2/2017 | Annen | F02B 63/041 |
| 2004/0009039 | A1 * | 1/2004 | Corcoran | E01C 19/38 404/117 |
| 2011/0073631 | A1 * | 3/2011 | Tippmann, Sr. | F01B 11/04 173/19 |
| 2013/0220656 | A1 * | 8/2013 | Schwarz | F02G 1/0435 60/520 |

* cited by examiner

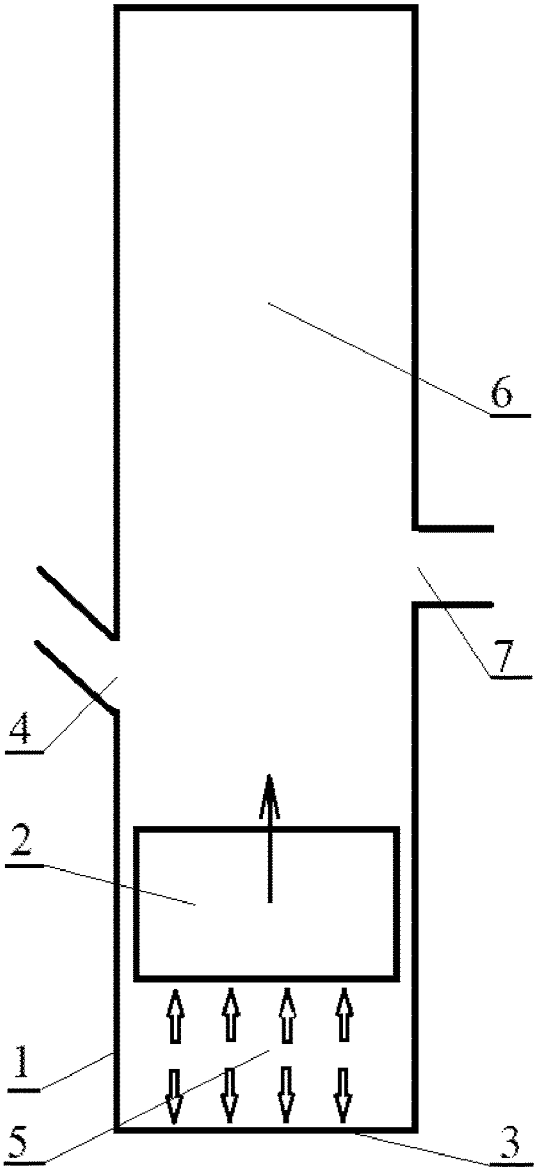
Fig. 1a. Combustion and expansion of gases in the combustion chamber
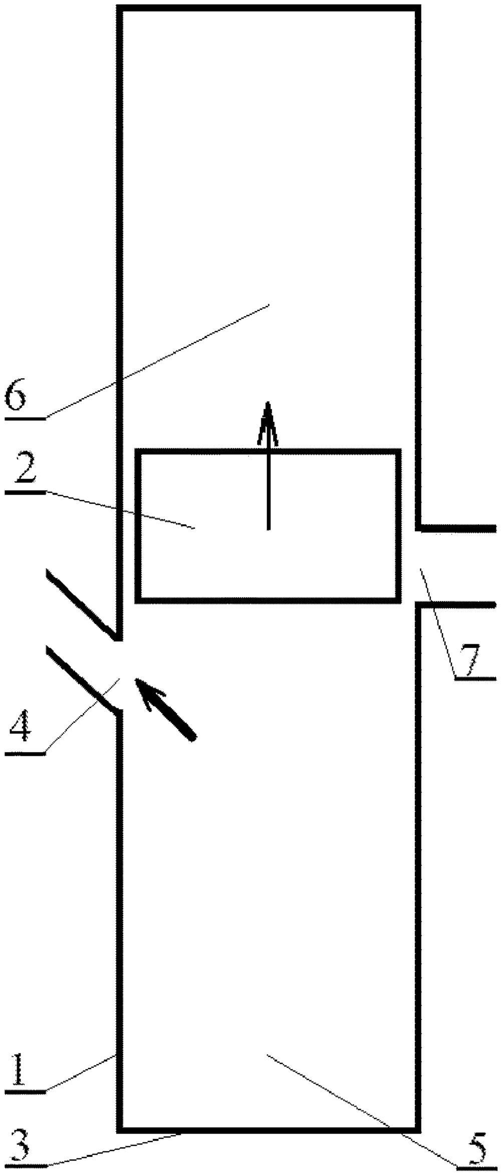
Fig. 1b. Exhaust gases flow out (black arrow) of the cylinder

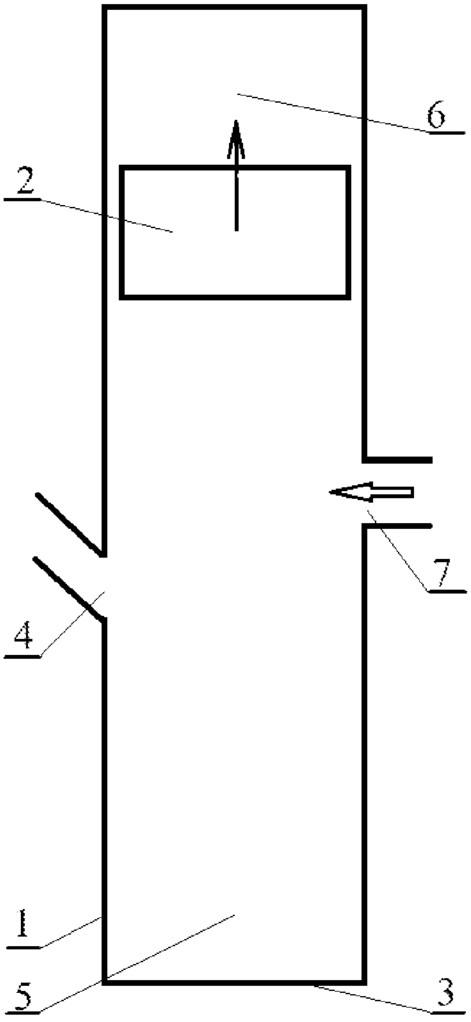
Fig. 1c. Intake. The white arrow shows the air entering in the cylinder
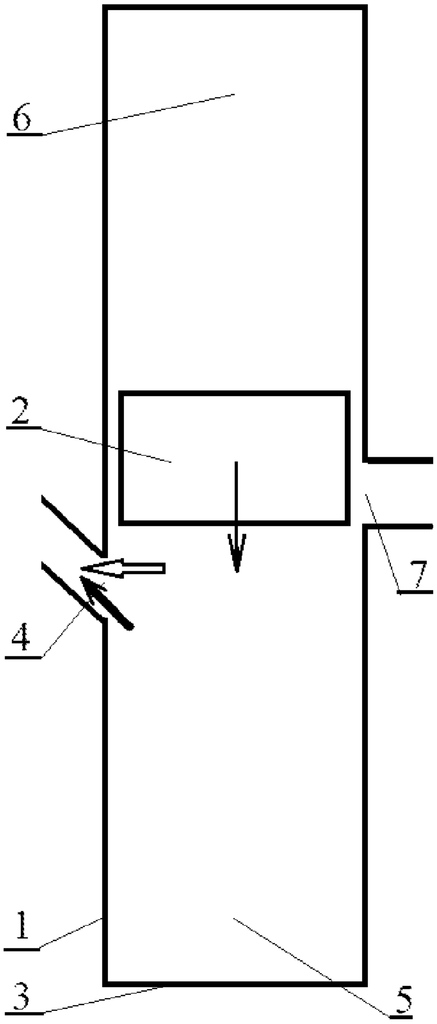
Fig. 1d. Scavenging in the bottom combustion chamber

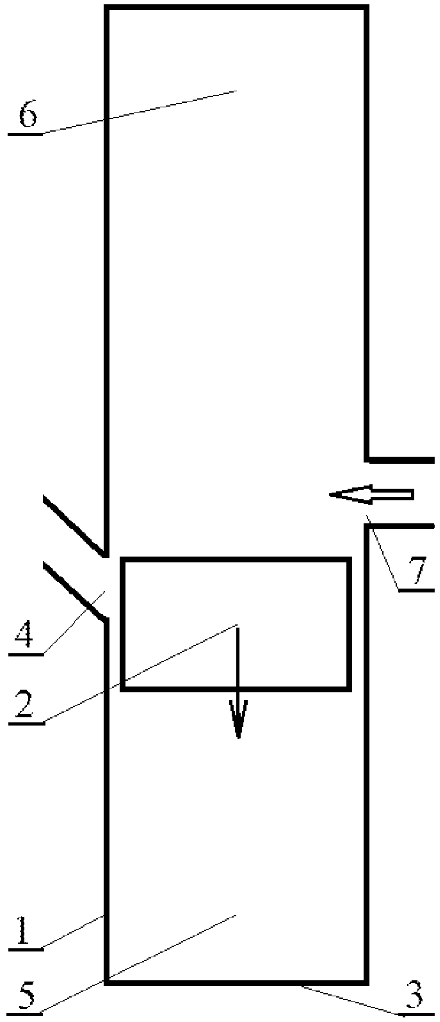
Fig. 1e. Compression in the bottom combustion chamber

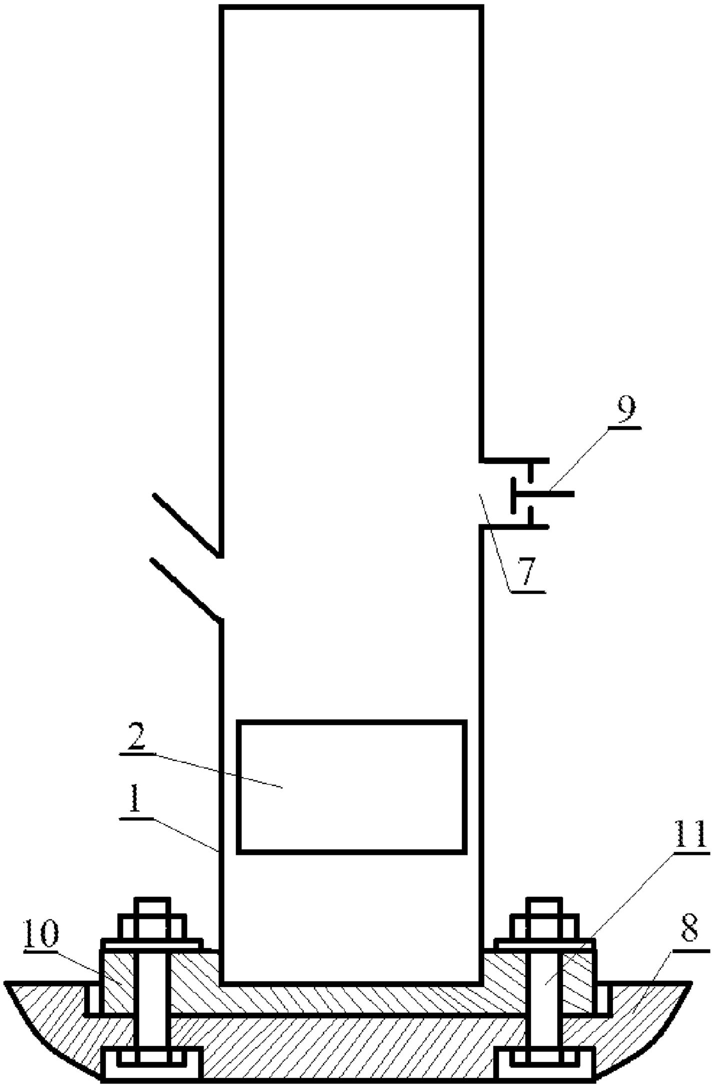
Fig. 2. Vibratory plate with free piston engine

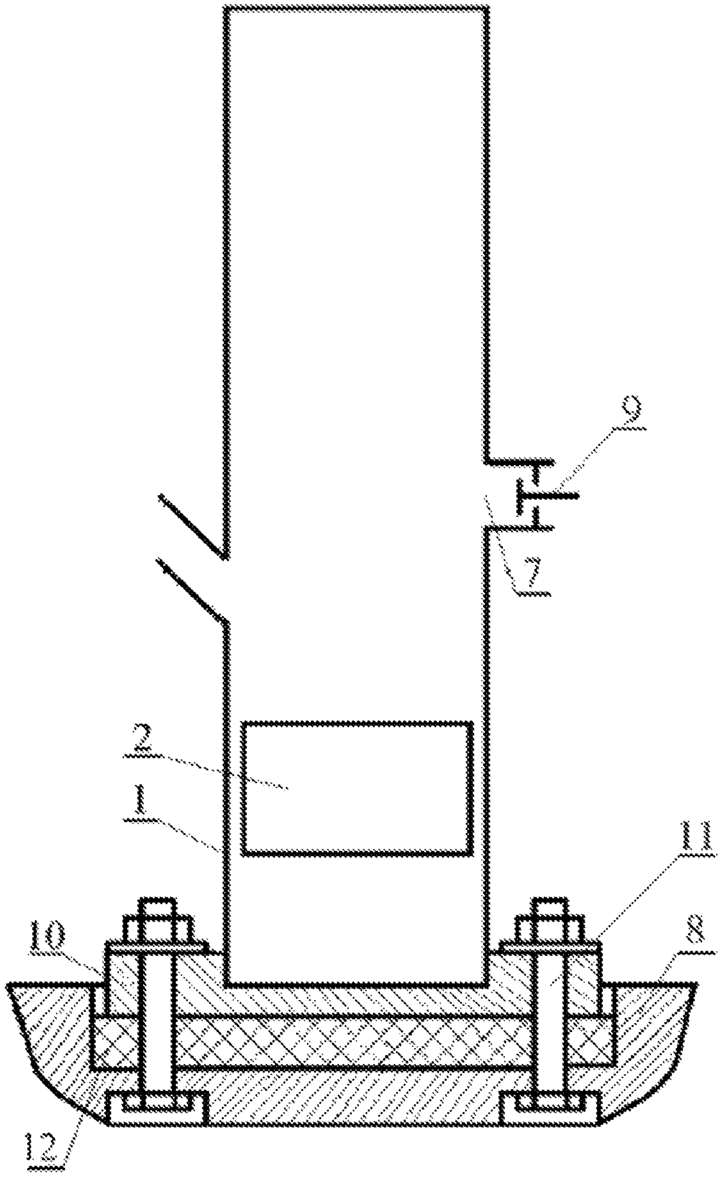
Fig. 3. Cylinder 1 is connected to plate 8 through an elastic pad 12.

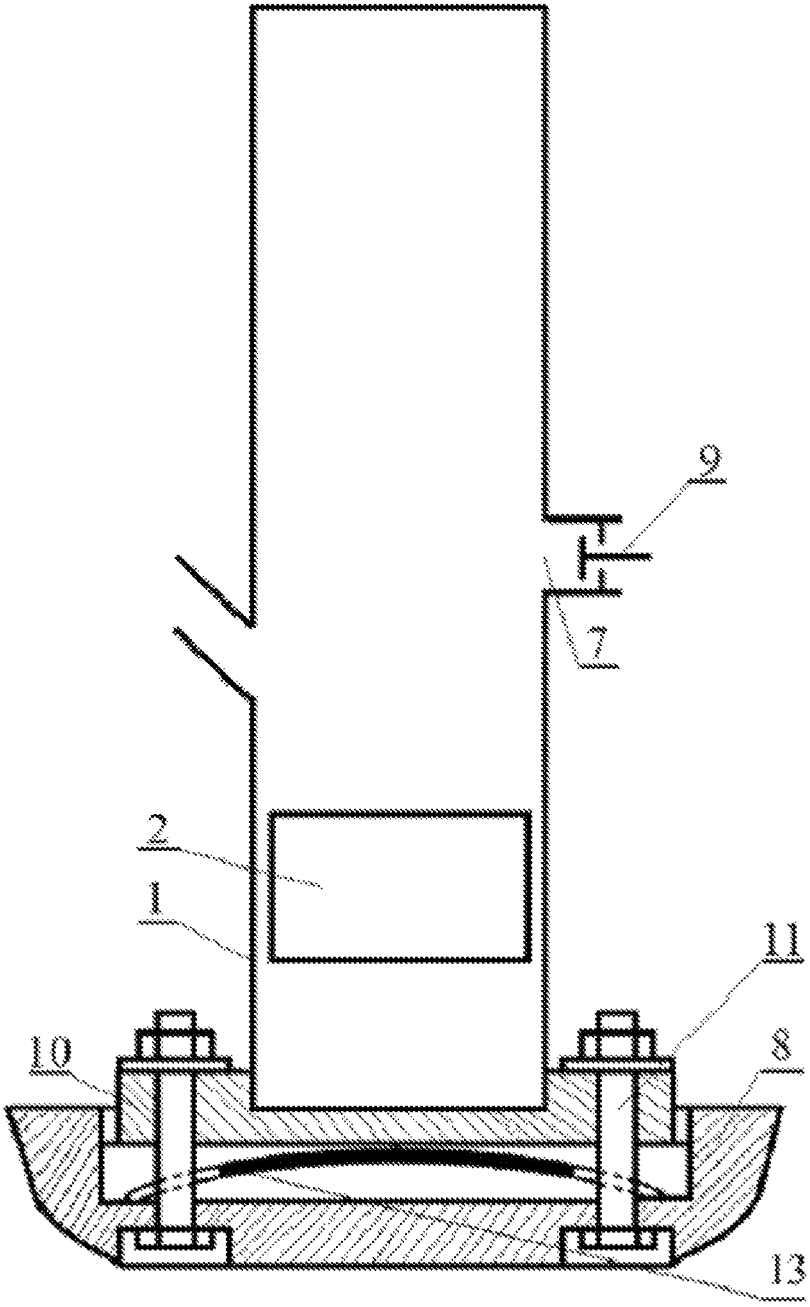
Fig. 4. Cylinder 1 is connected to plate 8 through a spring 13.

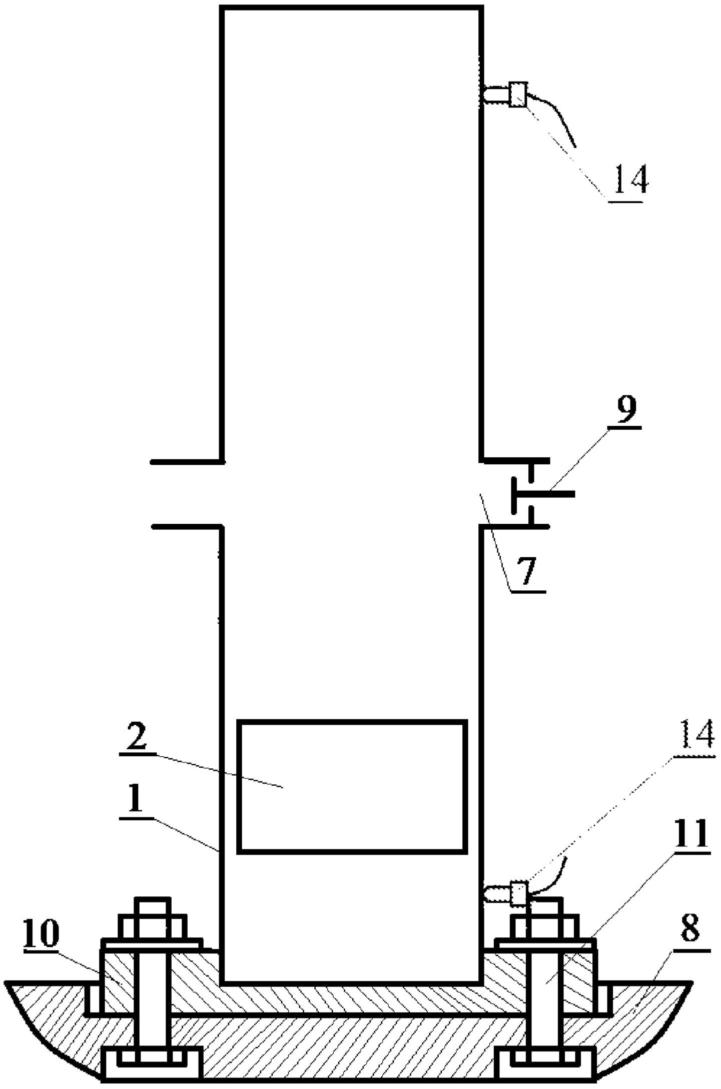
Fig. 5a. Fuel injection through injectors 14. Diesel cycle operation.

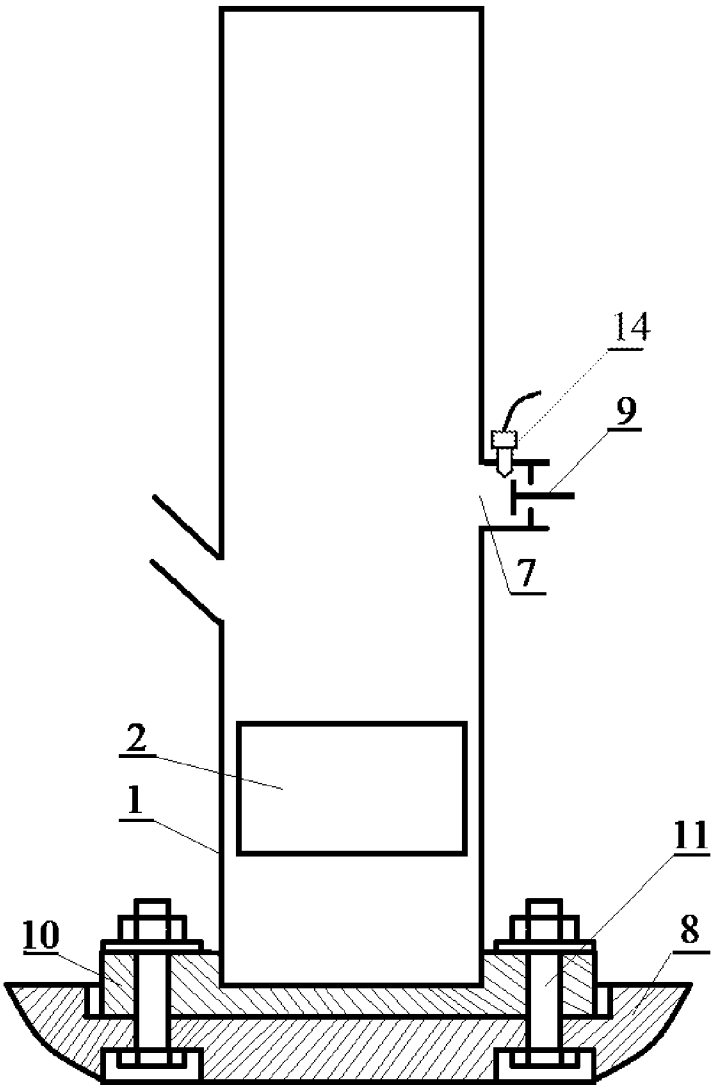
Fig. 5b. Fuel injection through injector 14, installed after the intake valve.

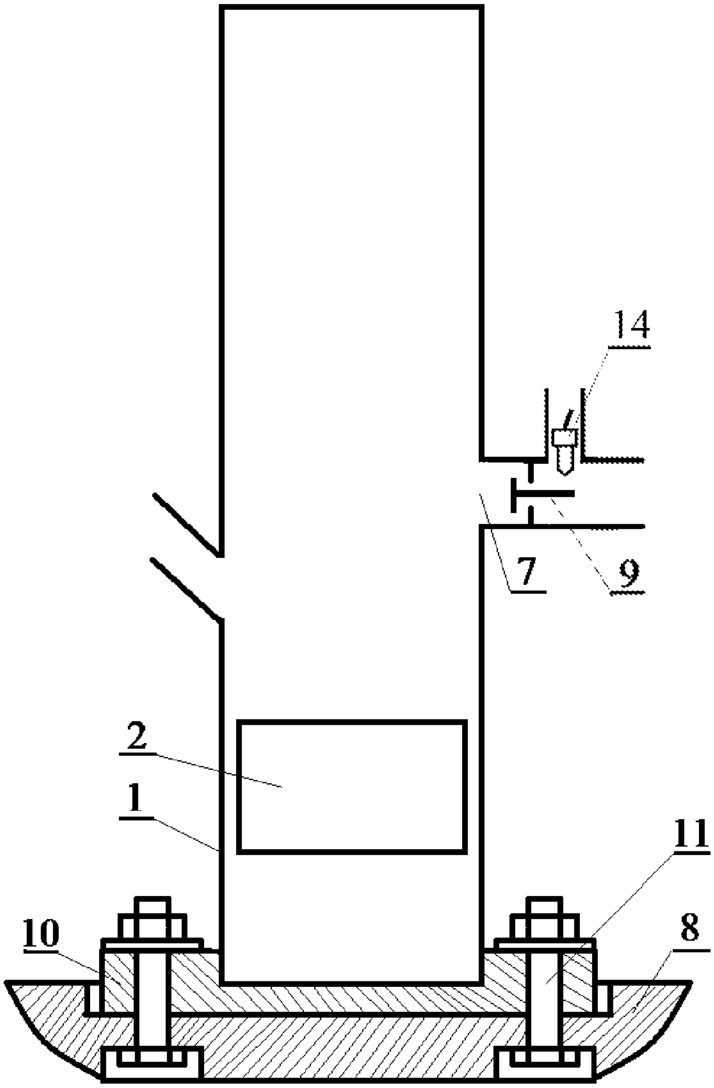
Fig. 5c. The injector 14 is installed before the inlet valve.

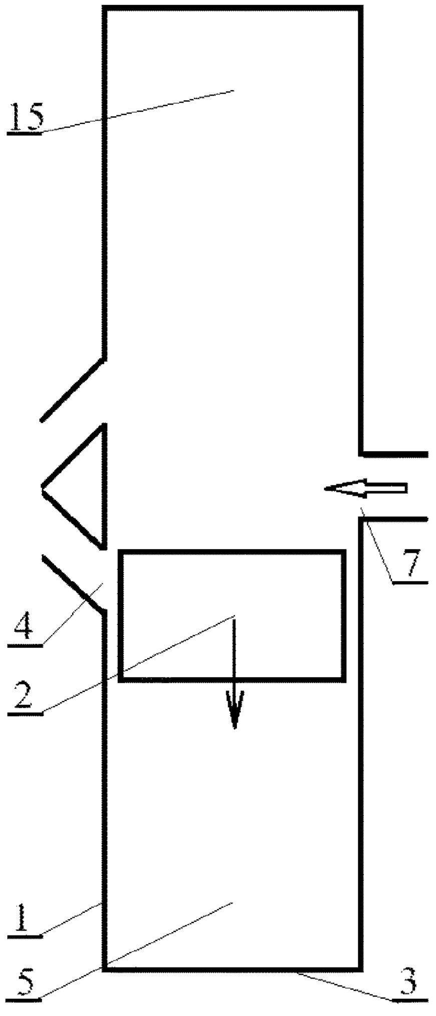
Fig.6. Combustion chambers are between the piston and each of the cylinder heads.

VIBRATORY PLATE AND ITS ENGINE

FIELD OF THE INVENTION

The invention relates to vibratory plates (vibratory plate compactor machines, vibration plate compactor machines, vibratory hammers). The invention also relates to diesel or gasoline hammers, which are used for driving piles, various devices for punching holes in the ground, walls, for breaking something, and the like.

The invention also relates to free piston engines (FPE) in which the piston moves reciprocally in the cylinder. Here and below, only single-piston FPE, FPE with an unbalanced piston are considered. Single-piston FPE with an unbalanced piston is understood as FPE, in which the piston is a single part or the piston is several parts connected into a single whole. In other words, all points of the piston make the same movement, the trajectories of the points differ only in the initial coordinates, or, in another formulation, the piston, all points of which have practically the same speed relative to the cylinder.

For example, FPE, which has two parallel cylinders, the pistons of which are connected (fixed coupling) to each other and do not move relative to each other, i.e. move similarly or almost similarly, in this terminology it is a single-piston with an unbalanced piston (or, in short, an FPE with an unbalanced piston).

The FPE, which has two opposed pistons moving in antiphase (in opposite directions), is not a single-piston FPE in the proposed terminology. Opposite pistons are movably interconnected and are fully or partially balanced.

BACKGROUND OF THE INVENTION

There is reciprocating motion of the plate in the vibratory plate. A piston internal combustion engine (ICE) is used to drive the vibratory plate. The reciprocating motion of the pistons is converted into a rotational motion of the crankshaft, which rotates a vibration mechanism through a pulley. The vibration mechanism has a shaft or have two shafts with unbalanced masses (with unbalanced weights, the center of gravity of which is displaced relative to the axis of rotation). The rotation of the shaft or shafts with unbalanced masses creates a force, the vertical component of which is periodic, pulsating (acts with the speed of rotation of the shaft) and is transmitted to the plate. The plate compacts soil, gravel, asphalt, etc.

That is, in the vibratory plate, the reciprocating motion of the piston is converted into a series of rotational motion, and then into the reciprocating motion of the plate. Such a transformation of motion and forces complicates the mechanism of the vibratory plate, increases its weight and dimensions.

Also, in a number of other machines the reciprocating motion of the pistons is converted into the rotational motion of the crankshaft, and the latter is converted into the reciprocating motion of the executive body. This reduces the power-to-weight and size ratio of the machines and reduces its efficiency and reliability.

BRIEF SUMMARY

It is proposed to use a free-piston engine with one piston as a vibratory plate engine. In this free piston engine, the piston in the cylinder reciprocates between the heads (between the covers, between the ends) of the cylinder. At the same time, according to the laws of mechanics, the cylinder also moves reciprocally, and its movements are opposite to the movements of the piston. The cylinder is mounted vertically on the plate.

Consider combustion in the cylinder when the piston is "down", at bottom dead center, near the bottom cylinder head. After combustion, the gas pressure acts on the piston and on the cylinder. The piston moves up, and the gas pressure on the cylinder head is transmitted down to the plate, the cylinder and the plate move down. The periodic force acting on the plate and the periodic downward movement of the cylinder and the plate (which connected to the cylinder) executed the compaction of the soil and other functions of the vibratory plate.

BRIEF DESCRIPTION OF THE DRAWINGS

FIGS. 1*a*, 1*b*, 1*c*, 1*d*—illustrate the engine cycle of a simple version of the FPE which can be used for the operation of the vibratory plate.

FIG. 1*a*. Combustion and expansion of combustion products (power stroke) in a combustion chamber (a bottom combustion chamber). The arrows indicate the gas pressure on the piston and a (bottom) cylinder head. The piston moves up.

FIG. 1*b*. Exhaust gases flow out (black arrow) of the cylinder. The piston moves up.

FIG. 1*c*. Intake. The white arrow shows the air entering in the cylinder (in the bottom combustion chamber) through the port. The piston moves up.

FIG. 1*d*. Scavenging in the bottom combustion chamber. More precisely, the displacement (pushing) of air (white arrow) and combustion products (black arrow) through the exhaust port. The piston moves down.

FIG. 1*e*. Compression in the bottom combustion chamber. The piston moves down.

FIG. 2. Vibratory plate with free piston engine.

FIG. 3. Cylinder 1 is connected to plate 8 through an elastic pad 12.

FIG. 4. Cylinder 1 is connected to plate 8 through a spring 13.

FIG. 5*a*. Fuel injection though injectors 14, Diesel cycle operation.

FIG. 5*b*. Fuel injection though injector 14, installed after the intake valve.

FIG. 5*c*. The injector 14 is installed before the inlet valve and is attacked to the vibratory plate with the possibility of moving the cylinder and the injector relative to each other.

FIG. 6. Combustion chambers are on both sides of the piston: one chamber (5) is between the piston and one of the cylinder heads, the second chamber (15) is between the piston and the second cylinder head, combustion is executed in both combustion chambers.

DETAILED DESCRIPTION OF THE INVENTION

The present invention proposes to use the free-piston engine (FPE) as a vibratory plate engine. In the section "FIELD OF THE INVENTION" it is stated that in accordance with the purposes of the present invention, FPEs similar to those depicted in FIGS. 1 and 2 are used to drive the vibratory plate. These are FPEs, in which an unbalanced piston 2 moves in cylinder 1. The piston is one part, or, in another formulation, all points of the piston have practically the same speed relative to the cylinder. FIGS. 1 and 2 show the vertical mounting of such an FPE on a vibratory plate.

For the vibratory plate, the FPE with two working cavities (with two combustion chambers) can be used (see FIG. 6). This refers to the combustion chambers on both sides of the piston 2 (one chamber is between the piston and one of the cylinder heads, the second is between the piston and the second cylinder head). In this case, combustion (engine cycle) takes place in both chambers.

Also, another FPE can be used, it is FPE, in which one cavity (one combustion chamber) is the working (combustion) cavity, and the other cavity is a compressor chamber (this chamber can also be called a buffer chamber). Said FPE version (suitable for driving the vibratory plate, for use as the vibratory plate engine) is described below. As seen in FIGS. 1, 2, the working chamber 5 (combustion chamber 5) is located in the lower (bottom) part of the FPE (between piston 2 and the bottom head 3 of cylinder 1), and the compressor chamber 6 is in the upper part of the FPE (between piston 2 and the upper cylinder head).

In other words, the combustion chamber is located between the piston and the cylinder head that is closer to the plate of the vibratory plate, the cylinder head that is fixed to this plate, and the compressor (buffer) chamber (cavity) is located on the other side of the piston (located between the piston and the opposite head).

In this FPE, the piston moves reciprocally, and the cylinder 1 (FIGS. 1, 2) performs reciprocating movements opposite to the movements of the piston 2. The cylinder is mounted vertically and fixed to the plate 8 (FIG. 2). In each engine cycle after combustion into a bottom chamber 5 (FIG. 1*a*) the gas pressure acts on the piston and on the cylinder (the gas pressure on the piston 2 and on the bottom cylinder head 3 is shown by small arrows), the piston moves up (hereinafter, the direction of movement is shown by the large arrow on the piston) and the cylinder 1 moves down under the action of gas pressure. Since the cylinder 1 is fixed to the plate 8 (see FIG. 2), plate also moves downward and compacts soil, gravel, etc.

Depicted on FIG. 1*a*, combustion and expansion processes in the bottom chamber can be considered as the power stroke, in which the piston moves upward under the pressure of the combustion products.

Above the piston in the compressor chamber (cavity) 6 at this time (FIG. 1*a*) a part of the air is pushed out of the cylinder through the exhaust port 4. It is possible a scavenging of the cylinder due to the use of gas-dynamic phenomena, in particular, due to the correct choice of lengths and other sizes of intake and exhaust pipes (manifolds) (is not shown in the figures).

To prevent the backflow of fresh air from the compressor chamber 6 through the port 7, a valve can be mounted on this port, for example, a check valve (reed valve) shown in FIG. 2. A gas dynamic valve can also be used. This valve has a lower resistance to the flow of air entering the cylinder than the resistance to the flow of air out of the cylinder. The gas dynamic valve may be similar to the Tesla gas dynamic valve.

In the combustion chamber 5, in the bottom part of the cylinder 1, while the piston continues to move upward (see FIG. 1*b*), the piston opens the exhaust port 4, and the combustion products (their movement is shown by the black arrow) flows out of the cylinder (from the combustion chamber 5) into the port 4.

Above the piston in the compressor chamber 6 (see FIG. 1*b*) while further movement of the piston, the latter closes the intake port 7, and air compression begins in the compressor chamber. During compression, the piston moves upward by inertia.

Further compression of air in the compressor chamber 6 while the piston continues to move upward by inertia is shown in FIG. 1*c*.

As is clear from FIG. 1*c*, in the lower part of cylinder 1, between the bottom head 3 of cylinder 1 and piston 2, the continuing increase in the volume of the combustion chamber 5 and, therefore, the expansion of gases leads to a drop in pressure in this chamber below atmospheric, and air is sucked into the cylinder through the intake port 7, into the combustion chamber 5.

Further, the piston, continuing its upward movement, continues to compress the air in the chamber 6 (between the upper head of the cylinder 1 and the piston 2). The pressure in the chamber 6 increases, the piston stops and begins to move in the opposite direction, down. This movement is shown in FIG. 1*d*. After the piston closes the inlet port 7 (see FIG. 1*d*), the intake into the combustion chamber 5 is stopped and a part of the previously entered air and residual combustion products are displaced through the exhaust port 4.

Further, while the piston moves down, the lower edge of the piston 2 (see FIG. 1*e*) passes through the port 4, and compression begins in the chamber 5; after compression (FIG. 1*a*), fuel self-ignition and combustion occur in chamber 5. And the engine cycle is repeated.

In chamber 6 (see FIG. 1*e*), when the piston moves downward after piston 2 passes port 7, ambient air enters through port 7 into compressor chamber 6. Then, in this chamber, the engine cycle is repeated, i.e. the piston moves upward (FIG. 1*a*), etc.

The FPE under consideration can operate both on a diesel cycle with fuel injection into the combustion chamber (into the combustion chambers) and self-ignition of fuel, and when ignited from an external source (from a spark). FPE can run on gasoline, diesel and, due to its high compression ratio, many other fuels.

This FPE has a regulated fuel supply. An increase in the fuel supply leads to an increase in the combustion pressure, therefore (see FIG. 1*a*) to an increase in the force of the plate impact on the rammed material: soil, gravel, asphalt, tiles (for sidewalks), etc. Also, an increase in combustion pressure increases the frequency of FPE operating cycles, hence the frequency of impacts of the plate on the rammed material.

The FPE considered above or a similar FPE in which the unbalanced piston 2 is reciprocating in cylinder 1 is used as an engine of the vibratory plate (FIG. 2). Cylinder 1 FPE is fixed to plate 8 rigidly either through a spring or through spring washers.

In FIG. 2 the lower part of the cylinder 1 has a circular projection (disc) 10. The cylinder and disc 10 are integral (one piece). For example, they can be made (turned) from one piece of metal. In the FPE shown in FIG. 2, the disc 10 and the plate 8 of the vibratory plate are tightened (connected, fixed) with bolts 11, which ensures a rigid connection between the cylinder and the plate.

In FIG. 2 shows that the cylinder is mounted vertically on the plate of the vibratory plate. In an embodiment, the attachment of the cylinder to the plate is performed with an inclination relative to the perpendicular to the plate 8, so that there is an angle between the axis of the cylinder and the perpendicular to the plane of the plate. The tilt of the cylinder serves to move the vibratory plate horizontally while ramming (in the process of ramming); move means moving along the rammed area.

In a further embodiment, the fixing of the cylinder to the plate is made with the possibility of changing the specified inclination. A stepwise, discrete change in inclination is possible (of course, with the cylinder fixing in discrete tilts), for example, the cylinder can be installed in three positions (relative to the horizontal plate of the vibrating plate): vertical, inclined forward, inclined back. Depending on the inclination, the vibratory plate ramps the soil, etc., remaining in place, moving forward, moving back.

Obviously, it is possible to produce a variant of a vibratory plate with smooth regulation of the cylinder tilt angle. This means setting the desired tilt angle and fixing the cylinder at the selected tilt angle. Among the mechanisms for changing the angle between the axis of the cylinder and the perpendicular to the plane of the plate, the following can be considered. The cylinder is mounted obliquely on an auxiliary part (or auxiliary plate), which can be rotated around a vertical axis.

What is claimed is:

1. A vibratory plate and its engine, the engine comprising a piston sliding in a cylinder, an upper cylinder head, and a bottom cylinder head, wherein the engine is a single piston free-piston internal combustion engine (FPE), in the said FPE the piston in the cylinder reciprocates between the upper cylinder head and the bottom cylinder head, wherein the cylinder also reciprocates, and the cylinder's movements are opposite to those of the piston, and wherein the cylinder of said FPE is connected to the vibratory plate.

2. The vibratory plate according to claim 1, wherein the cylinder is rigidly connected to the vibratory plate or cylinder is connected to the vibratory plate through one of an elastic pad or a spring.

3. The vibratory plate according to claim 1, wherein the cylinder is mounted on the vibratory plate vertically, or in order for the vibratory plate to move horizontally during tamping, the cylinder is mounted with a variable inclination of the cylinder relative to a vertical axis.

4. The vibratory plate according to claim 1, wherein said FPE comprises two combustion chambers: one combustion chamber defined between the piston and the bottom cylinder head, and a second combustion chamber defined between the piston and the upper cylinder head, wherein combustion is executed in both combustion chambers.

5. The vibratory plate and its engine according to claim 1, wherein said FPE comprises a combustion chamber defined between the piston and the bottom cylinder head, and a compressor chamber defined between the piston and the upper cylinder head.

6. The vibratory plate and its engine according to claim 5, wherein a plate of the vibratory plate is coupled to the bottom cylinder head.

7. The vibratory plate and its engine as in any one of claims 1-6, where said FPE has a regulated fuel supply, wherein the fuel supply is increased to facilitate increasing the force and frequency of a plate impact.

* * * * *